Dec. 31, 1957  W. H. McCORMACK  2,818,544
ZERO IMPEDANCE CIRCUIT
Filed Jan. 19, 1953

WILLIAM H. McCORMACK,
INVENTOR.

BY
ATTORNEY

United States Patent Office 2,818,544
Patented Dec. 31, 1957

2,818,544
ZERO IMPEDANCE CIRCUIT

William H. McCormack, Torrance, Calif., assignor to The Garrett Corporation, Los Angeles, Calif., a corporation of California Application January 19, 1953, Serial No. 331,983

14 Claims. (Cl. 323—45)

The present invention relates generally to electrical means, and is more particularly concerned with a unique arrangement which will permit resistor, capacitor and inductor elements to be placed in an improved circuit in such a way as to produce in effect a zero impedance in the circuit.

The invention is capable of general application and is susceptible of wide and varied uses such, for example, as for indicatnig variations in a circuit characteristic, utilizing changes of a crcuit characterstic as a control medium for a use circuit, obtaining phase shift, use in differentiating and integrating circuits and other uses which will readily appear to those skilled in the art.

It is an object of the herein described invention to provide in an electrical device, an input circuit having in effect a zero impedance.

Still another object is to provide a novel arrangement by which the voltage across an element in an input circuit may be reinserted back into the circuit as an equal but opposite phase to that of the element, so as to provide in effect zero impedance in the circuit, and enable utilization of the voltage variations across the element as a voltage source for a use circuit.

It is also an object to provide an improved method for obtaining zero impedance in an input circuit of a device.

Having the foregoing in mind, the invention briefly comprises in its broad aspects an input circuit containing a circuit element in the form of a resistor, an inductor or a capacitor. The voltage drop across the element is amplified and applied to one winding of a transformer, the other winding of which is connected in the input circuit in series with the element in such a way that the voltage induced therein will be equal and of opposite phase to that across the element. A use circuit is connected across the element and the transformer winding connected therewith, so as to be responsive to voltage changes across the element due to its variation or changes in current flow therethrough in the input circuit.

The present invention in one form of its embodiment permits a constant current input to be obtained from a source which provides a relatively low current, and in practice provides a simple arrangement which may be utilized instead of a more complicated and expensive servo-mechanism for supplying a signal to a use circuit which may be detected in terms of a variable characteristic of the circuit connected to said source, or variations in a media which affects a characteristic of said circuit.

Further objects of the invention will be brought out in the following part of the specification, wherein detailed description is for the purpose of fully disclosing several embodiments of the invention without placing limitations thereon.

Referring to the accompanying drawings, which are for illustrative purposes:

Figure 1:
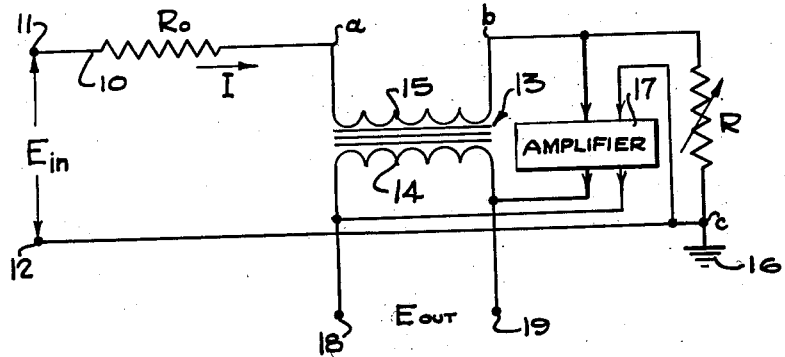
Fig. 1 is a view schematically representing a circuit embodying the basic concept of the invention in connection with a resistor circuit element.

Referring generally to Fig. 1, the basic concept of the invention is shown as comprising a loop circuit formed by a conductor 10 having terminals 11 and 12 which are adapted to be connected with an electric source so that this loop constitutes an input circuit. As shown, the input circuit contains a current limiting resistor $R_0$ which is connected in series with a zero impedance consisting of a transformer 13 having a winding 14 and a winding 15 which is connected into the loop circuit in series with a variable circuit element, illustrated for purposes of description as a resistor R which may be varied per se or may be mechanically changed in response to changes in media such as temperature, pressure or the like. This element might, however, in certain adaptations of the invention comprise an inductor L or a capacitor C, as shown respectively in Fig. 2 and Fig. 3. If desired, the loop return of the circuit may be grounded as indicated at 16.

A conventional amplifier 17 is provided in a connection between the resistor R and the winding 14 of the transformer 13, so that the voltage drop across this resistor will be amplified and applied to the winding 14 of the transformer which is connected into the loop circuit in such a manner that the voltage of the winding 15 will be of the same amplitude, but reversed phase, to that across the resistor R. This amplifier may be of any of the conventional types, such as magnetic, transitors, mechanical rectifier, cathode follower, etc., which may be tuned to give a suitable gain factor, as will hereinafter be discussed. A circuit is brought out to terminals 18 and 19 which may be connected to a use device.

The theoretical operation of the invention as described above will now be considered.

Let:

$e_1$ = the voltage between points $b$ and $c$.
$e_2$ = voltage between points $a$ and $c$.
$Z_{ac}$ = impedance between points $a$ and $e$.
$K$ = amplification factor of amplifier.
$N$ = turns ratio of transformer.

$$e_2 = e_1 + KNe_1$$
$$= e_1(1+KN)$$

Then by setting $KN = -1$ $$e_2 = 0$$

Therefore $$Z_{ac} = \frac{e_2}{I} = \frac{0}{I} = 0$$

Where I is the current flowing in the circuit $$I = \frac{E_{in}}{R_0} \left(\text{a constant}\right)$$

$$e_1 = \frac{R \cdot E_{in}}{R_0}$$

From the above it will be apparent that, if the voltage drop $e_1$ is amplified and is inserted into the circuit through the amplifier 17 and transformer 13 in the same magnitude, but reversed phase to that of the voltage drop across resistor R, the sum of the voltages across resistor R and the winding 15 of the transformer will be zero. Thus, the flow of current in the circuit is dependent only upon the value of $R_0$, and the voltage $e_1$ is directly proportional to the value of resistor R, since the current through this resistor is of constant value.

Figure 2:
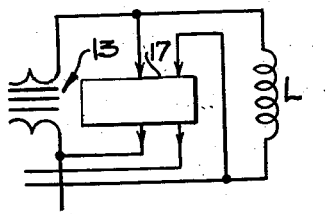
Fig. 2 illustrates a fragmentary portion of the circuit to show the use of an inductor as the circuit element.
Figure 3:
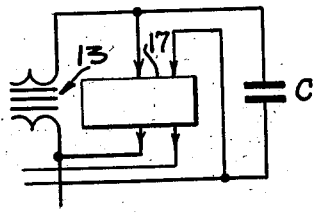
Fig. 3 is a similar view in which the circuit element is a capacitor.

The utilization of an impedance including either an inductor or capacitor instead of a resistor, as illustrated in Fig. 2 and Fig. 3, is particularly advantageous where it is desired to provide a phase shift in differentiating and integrating circuits. The current being constant, a true 90 degree displacement of voltage will be obtained in the use circuit with respect to the voltage in the input circuit.

Figure 4:
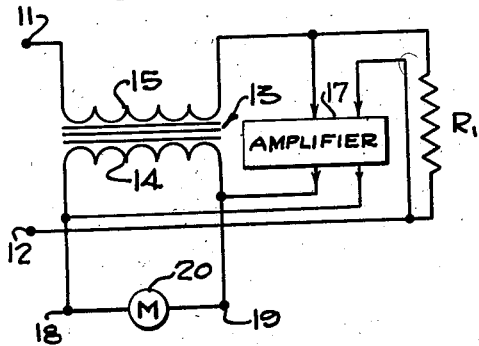
Fig. 4 illustrates a practical embodiment in which the invention is utilized for measuring a characteristic, such as current, of a circuit.

Referring to the arrangement shown in Fig. 4, this circuit is arranged to be connected into a circuit conductor at terminals 11 and 12, without introducing additional impedance, so as to permit, for example, the measurement of current flow in the conductor. The impedance in this case comprises a fixed resistor $R_1$ instead of a variable resistor R, as previously explained. In this arrangement, it is proposed to utilize a meter 20 connected to the terminals 18 and 19. Such a meter would be a voltmeter since it reflects changes in voltage drop across the resistor $R_1$. By calibrating the meter in terms of amperes, this meter will indicate the flow of current in the loop circuit through resistor $R_1$. Thus, with the resistor $R_1$ being of fixed value, the voltage drop across this resistor will vary in accordance with the current flowing therein. In this device, the invention is utilized for the measuring of current flow in a circuit.

Figure 5:
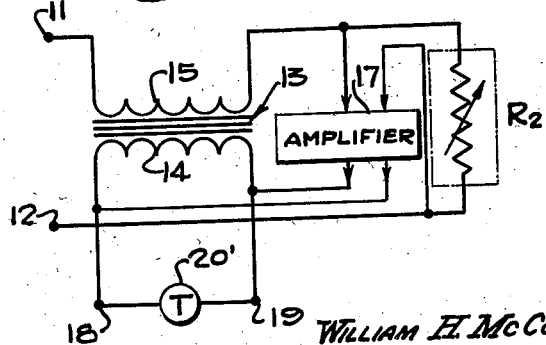
Fig. 5 is another arrangement in which the features of the invention are embodied in a temperature measuring device.

As a further example of use for the present invention, reference is had to Fig. 5 wherein the impedance is shown as including a variable resistor $R_2$. This resistor may take various forms, and in the present instance is considered as comprising a temperature probe which changes its resistance in accordance with changes of temperature. The meter, as indicated by the numeral 20', would therefore be calibrated in terms of temperature.

Various modifications may suggest themselves to those skilled in the art without departing from the spirit of the invention, and, hence, I do not wish to be restricted to the specific form shown or uses mentioned, except to the extent indicated in the appended claims.

I claim:

1. In an electrical circuit: the combination of zero impedance means including a circuit element and an inductor element in series; means responsive to voltage variations across the circuit element for simultaneously varying the voltage drop across the inductor element in an equal and opposite direction; and a use circuit connected across one of said elements.

2. Electrical means, comprising: an input circuit; a resistor in said circuit variable in accordance with a sensed medium; a transformer having one winding connected in said circuit; an amplifier for amplifying the voltage drop across said resistor and applying it to the other winding of said transformer; and a voltage responsive device having a supply circuit connected in parallel with said resistor.

3. Electrical means, comprising: an input circuit; a resistor in said circuit variable in accordance with a sensed medium; a transformer having one winding connected in said circuit; an amplifier for amplifying the voltage drop across said resistor and applying it to the other winding of said transformer; and an indicating device having a supply circuit connected in parallel with said resistor.

4. Electrical means, comprising: an input circuit; a variable resistor in said circuit; means for amplifying the voltage drop across said resistor; a transformer having a first winding connected to said amplifier and a second winding series connected in said circuit with a phase reversed with respect to the voltage across said resistor; a use circuit connected across said transformer first winding; and a current limiting resistor in said input circuit.

5. Electrical means, comprising: an input circuit; a variable resistor in said circuit; means for amplifying the voltage drop across said resistor; a transformer having a first winding connected to said amplifier and a second winding connected in said circuit in series with said resistor, the phase of the second winding of said transformer being reversed with respect to the voltage across said resistor; and a use circuit connected across said transformer first winding.

6. Electrical means, comprising: an input circuit; a resistor in said circuit; means for amplifying the voltage drop across said resistor; a transformer having a first winding connected to said amplifier and a second winding connected in said circuit, the phase of the second winding being reversed with respect to the voltage across said resistor; and a use circuit connected across said transformer first winding.

7. Electrical means, comprising: an input circuit; a resistor element in said circuit; inductive coupling means between said resistor and said circuit for applying a voltage to said circuit of substantially equal magnitude and opposite phase relation to the voltage across said resistor so as to effect substantially zero impedance in said circuit; and a use circuit energized in response to voltage changes across said resistor.

8. Electrical means, comprising: an input circuit; an inductor element in said circuit; inductive coupling means between said inductor and said circuit for applying a voltage to said circuit of substantially equal magnitude and opposite phase relation to the voltage across said inductor so as to effect substantially zero impedance in said circuit; and a use circuit energized in accordance with the voltage across said inductor.

9. Electrical means, comprising: an input circuit; a capacitor element in said circuit; inductive coupling means between said capacitor and said circuit for applying a voltage to said circuit of substantially equal magnitude and opposite phase relation to the voltage across said capacitor so as to effect substantially zero impedance in said circuit; and a use circuit energized in response to voltage changes across said capacitor.

10. Electrical means, comprising: an input circuit; a circuit element in said circuit; an inductor element in said circuit in series with said circuit element; means energized by the voltage across said circuit element for setting up a voltage across said inductor element of such character that the combined voltage drop across said circuit and inductor elements is substantially zero; and a use circuit varied in response to voltage changes across one of said elements.

11. Electrical means, comprising: an input circuit connectible with an electrical source; a resistor element in said circuit; means energized by the voltage drop across said resistor connected for applying a voltage component to said circuit of approximately the same amplitude but opposite phase to that across said resistor; and a use circuit responsive to voltage variations across said resistor.

12. Electrical means, comprising: an input circuit connectible with an electrical source; an element in said circuit opposing current flow in said circuit; means energized by the voltage drop across said element connected for applying a voltage component to said circuit of opposite phase to that across said element; and a use circuit responsive to voltage variations across said element.

13. Electrical means, comprising: a resistor element and an inductor element connected in series in a circuit, said inductor being a transformer having one winding connected in said circuit; amplifier means for amplifying the voltage drop across said resistor and applying it to the other winding of said transformer, said amplifier having an amplification factor (K) and the transformer a turn ratio (N) such that $$KN = -1;$$

and a use circuit coupled with said resistor, and being responsive to variations of voltage across said resistor.

14. The combination, comprising: a loop circuit adapted to be connected to an input voltage source; a transformer having a first winding and a second winding, the second winding being connected in said loop circuit; a variable sensing element in said circuit in series with said second winding; and a voltage amplifier having an input connected across said element and an output connected to said transformer first winding in such manner as to effect a second winding voltage substantially equal to the voltage across said element but of reversed phase, said element also being connected to an output circuit adapted to feed a connected load.

References Cited in the file of this patent

UNITED STATES PATENTS

| | | |
|---|---|---|
| 1,399,968 | Knopp | Dec. 13, 1921 |
| 1,773,772 | Berthold | Aug. 26, 1930 |
| 1,947,197 | Jarman | Feb. 13, 1934 |
| 2,570,015 | Van Loon et al. | Oct. 2, 1951 |